May 27, 1924.
M. J. BROWN
1,495,771
MEASURING AND SPRAYING APPARATUS FOR A VOLATILE FUMIGANT
Original Filed Aug. 21, 1922
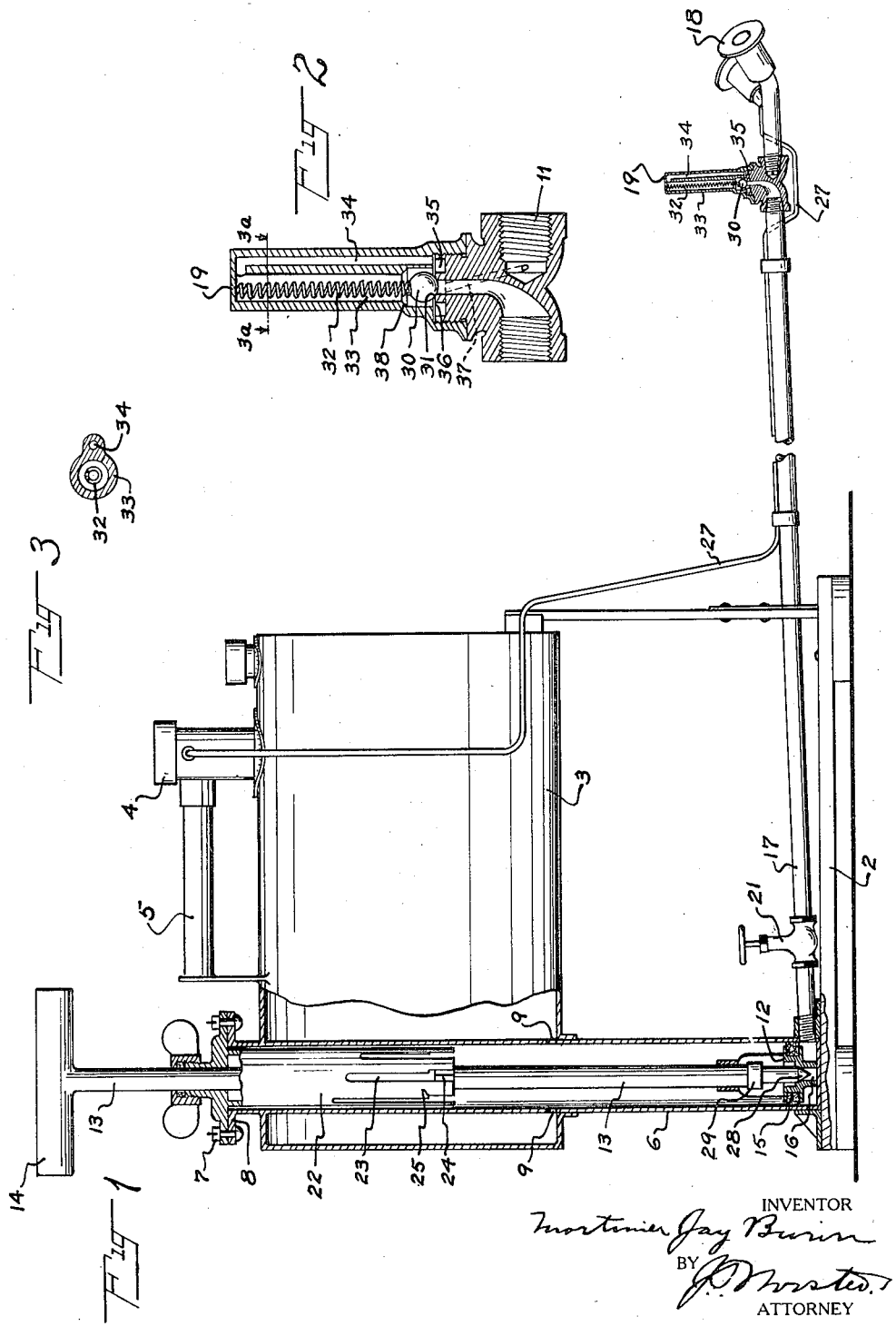

Patented May 27, 1924.

1,495,771

UNITED STATES PATENT OFFICE.

MORTIMER JAY BROWN, OF NIAGARA FALLS, NEW YORK, ASSIGNOR TO THE PACIFIC R & H CHEMICAL CORPORATION, OF LOS ANGELES, CALIFORNIA, A CORPORATION OF CALIFORNIA.

MEASURING AND SPRAYING APPARATUS FOR A VOLATILE FUMIGANT.

Continuation of application Serial No. 583,134, filed August 21, 1922. This application filed January 19, 1924. Serial No. 687,224.

*To all whom it may concern:*

Be it known that I, MORTIMER JAY BROWN, a citizen of the United States, and resident of Niagara Falls, in the county of Niagara and State of New York, have invented certain new and useful Improvements in Measuring and Spraying Apparatus for a Volatile Fumigant, of which the following is a specification.

This invention relates to apparatus for discharging measured quantities of volatile liquid fumigant, more especially liquid hydrocyanic acid for treatment of citrus trees. This application is a continuation in part of my previous application S. N. 501,553, filed September 19, 1921, and is a continuation of my other application S. N. 583,134, filed August 21, 1922.

In the former application is disclosed a machine combination wherein a measured quantity of fumigant is drawn into a pump barrel by gravity flow from the tank through a piston having a manually operated valve without reduction of pressure on the volatile fumigant, and expelled from the barrel to and through a pipe containing a pop-off valve, and to and through the spray nozzle. In the latter application is disclosed a similar machine together with an improved form of pop-off valve, with claims directed to the valve structure per se. The machine of the first application went into successful use in California and marked a distinct advance over previous machines in safety to operators, certainty of action in discharging the measured quantity on the tree, and reduction of previous loss by drip from the nozzle due to faulty cut-off. During such commercial operation of said machine, a small spurt or jet was at times discharged from the nozzle without apparent cause, especially in warm weather, which resulted in loss by drip on the ground and inaccuracy of charge delivered to the tree. The highest accuracy of dosage to the tree is required, both because of legal regulations, and to kill the scale without damage to the tree.

After considerable investigation and experiment I discovered that the cause was due to the presence of a gas pocket in the discharge line at the valve chamber. I found that a gas pocket in the line would be compressed by the initial flow and expanding upon cessation of the down piston stroke causing the spurt, but of insufficient force to atomize. After experimenting with various forms of valves I devised the form shown in said application Ser. No. 583,134 which successfully overcame these difficulties in all weather and gave an absolutely sharp cut-off by prevention of gas pockets in combination with the tank, barrel, piston, etc., of application Ser. No. 501,553. This enabled the charge as actually measured to be completely discharged in the manner desired, as in spray on the tree without spurting due to gas pockets in the line after cessation of the piston stroke.

So far as I am aware, the combination as thus worked out is the first in the volatile fumigant measuring and discharging art to initially charge a measured quantity of liquid without vaporization under the piston, and second, to discharge such measured quantity in all weather through a spray nozzle under such force that the entire measured quantity would be completely atomized without spurt or dropping due to gas pocket. These features constitute a material advance in this art, because the operator of such machine pays little attention to the temperature and cannot ordinarily see the action of the nozzle owing to it being under the tent, but he knows that the determined measured quantity is being charged into the barrel, and that such measured quantity is actually discharged, and without spurting after cessation of the piston stroke.

In the accompanying drawings:

Figure 1 is a sectional elevation of one embodiment of my invention,

Figure 2 is a section through the valve 19, and

Figure 3 is a section on the line 3ª—3ª of Figure 2.

The apparatus of my invention comprises a base 2 upon which is mounted a supply tank 3 for a volatile liquid fumigant, such as liquid hydrocyanic acid boiling at about 26.5° C. The tank is provided with a filling aperture normally closed by a cap 4 and has a handle 5 for convenience in carrying from place to place. Secured to the base and supporting the tank at one end is a pump barrel which extends up through the tank, the joints between the barrel and tank being sealed by welding or otherwise to prevent leakage. The upper end of the barrel has a flange 8 to which is secured by wing nuts 7 a device for variably controlling the stroke of the pump piston. The pump barrel immediately above the tank bottom is provided with one or more apertures 9 to permit the fumigant to flow by gravity into the barrel. Disposed in the barrel below the apertures 9 is a piston 12 which is loosely connected to the piston rod 13 so that the latter has limited motion relatively thereto. A handle 14 is provided at the upper end of the piston rod. The piston 12 comprises a hollow piston body having a packing ring 15 disposed intermediate the ends thereof. The piston above the packing ring is provided with one or more apertures to permit the ready flow of fumigant into the interior of the piston and through its central passage 16. Below the packing the central passage 16 is provided with tapered sides which form a seat for the conical valve 28 on the piston rod 13. Above the packing ring 15 the piston is provided with an extension engaged by collar 29 on the piston rod in raising the piston after the passage 16 has been opened. On downward movement of the piston rod, the valve 28 engages its seat below the packing and the piston expels the fumigant out of the barrel 6 through the discharge pipe 17. By this arrangement, the piston is pulled relatively to the packing in each direction, so that the packing does not tend to cant during movement, and cause leakage, as by uneven wear.

The pump is provided with means for measuring any desired quantity of fumigant. The measuring device includes a metallic skirt 22 depending into the pump barrel and provided at its upper end with a flange which engages the flange 8 on the pump barrel. The skirt is provided with a plurality of longitudinal slots 23 of different lengths opening at the bottom of the skirt. These slots are dimensioned to limit the upward movement of the piston to certain predetermined positions and thereby cause the discharge of a predetermined volume of fumigant depending upon the slot selected. A dog 24 on the piston rod is adapted to fit in any one of the slots to limit the upward stroke of the piston. These slots are preferably stepped so that at the will of the operator charges of different volume may be measured and ejected according to the slot in which the dog is positioned. For instance, the main portion of the slot may be dimensioned to accomplish the measurement of five units of liquid, and the shoulder 25 on one side to accomplish the measurement of three units. By reciprocating the piston rod and turning it after the proper number of reciprocations, the fumigator is enabled to discharge the desired units of liquid. The main portions of the slots are of different lengths, one for instance being the equivalent of five units of 16 cc., another five units of 18 cc., another five units of 20 cc., etc. For example, a complete slot might give five units of 16 cc. on the full stroke and one unit of 16 cc. on its short stroke when the dog engages the shoulder on one side. Thus considerable flexibility is permitted in measurement with the dog in any one slot. When the dog is to be inserted in a different slot the wing nuts 7 may be loosened and the skirt 22 raised and turned so that the dog engages the desired slot. This mechanism is described and claimed in my co-pending application Ser. No. 501,554 filed September 19, 1921.

The pipe 17 is provided at one end with an upwardly directed spray nozzle 18 disposed adjacent the ground so as to pass under the tent. For the purpose of preventing leakage through the discharge pipe due to the head of liquid in the tank when the passage 16 in the piston is open, the pop-off valve 19 is located in the delivery pipe. An ordinary cock 21 is located in the delivery pipe between the pop-off valve 19 and the pump barrel 6. The valve 21 is useful in case of an emergency, and also at times of inspection to ascertain if the piston packing is tight. Upon closing valve 21 and pressing down on the piston rod, the operator can tell whether there is leakage past the piston packing.

To avoid a gas pocket in the chamber of the pop-off valve 19 which tends to cause an objectionable spurt of fumigant from the nozzle after the piston stops, means are provided for clearing the valve chamber of any gas which might collect. The valve illustrated in Fig. 2 comprises the ball 30 pressed upon its seat 31 by the spring 32 in valve chamber housing 33, which is preferably removable and vertically disposed to facilitate inspection and cleaning of the valve and seat. Various forms of horizontal and other types of valves tried in order to avoid gas pockets were found unsatisfactory for one or another reason. A portion of fumigant passing the valve 30 rises in the valve chamber and flows down through the passage 34 into the annular chamber 35, carrying before it any gas that may have collected. Gas tends to collect in chamber 33 due to vaporization, especially in warm weather when the metal parts become heated. From the chamber 35 the fumigant passes through passage 37 to outlet 11. If all the fumigant be forced through the passage 34, it is found that the velocity at the nozzle is cut down, which reduces the efficiency of the spray. To avoid this and still clear the valve chamber of gas, a portion of the fumigant passes across passage 34 through a constricted opening 36 between the valve and the annular chamber 35 to passage 37 and outlet 11. This constriction is of a size to force a portion of the liquid through the passage 34. In case excessive force is applied to the pump the valve 30 is prevented from opening more than necessary by the tapered portion 38 of the chamber forming a stop for the valve, with the result that the valve directs an increased portion of the flow through the constriction.

The novel features of this valve mechanism are claimed in the above mentioned application Ser. No. 583,134, filed August 21, 1922.

In operation, the tank 3 is filled with fumigant by removal of the cap 4, which flows by gravity into the pump barrel above the piston through aperture 9. Upon lifting the piston rod 13, the passage 16 in the piston 12 is opened mechanically before movement of the piston so that the fumigant may flow through the passage 16 without producing any suction or reduction in pressure on the fumigant in the barrel and therefore safeguarding the same against vaporization during the upstroke. Previous machines having pistons with suction operated valves have been inaccurate because the full charge would not be measured owing to vaporization under the piston, and on the downstroke this vapor would be condensed. On downward movement of the piston rod, the valve 28 closes the passage 16 and the piston expels the fumigant through the delivery pipe 17 and nozzle 18. The pop-off valve 19 closes the delivery pipe on the up-stroke of the piston and prevents leakage of the fumigant through the discharge pipe under the head of fumigant in the tank. On the downstroke, the valve readily opens permitting the fumigant to flow through the passage 34 and constriction 36 whereby any gas that may have formed in the valve chamber 33 is driven out first with the result that the delivery pipe and valve chamber are entirely purged of gases at the commencement of the discharge. In machines prior to mine, it has been necessary to blow out the discharge line between charges, which was not satisfactory because of carelessness of the operators, and also inconvenient, whereas this machine does not require such blowing out between charges. The light gravity of liquid HCN in conjunction with the valve mechanism adjusted thereto and with the constriction at the nozzle precludes any ram or momentum effect in the short discharge line beyond the valve so that the closing of the valve is instantly effective at the nozzle. Inasmuch as the vapors of the fumigant are poisonous, a vent tube 27 connects the vapor space in the top of the tank 3 with the nozzle so that the operator is not in danger of being poisoned and no reduction in pressure occurs in the tank 3 as the liquid drains out. For testing the wear of the piston, the valve 21 may be closed and pressure on the piston rod indicates whether there is any leakage past the piston.

Among the advantages of this invention may be mentioned the sharp cut-off at the nozzle and the elimination of any spurt of the liquid after the valve is closed due to the cushioning effect of a gas pocket in the discharge line. Since the end of the pipe is under the tent, the operator cannot tell whether the intended measured charge is entirely discharged as spray on the tree, or only partially and the remainder as useless drip and dangerous to the tree because diminishing the charge desired on the tree. The provision of means for charging the pump cylinder without vaporizing the volatile fumigant is necessary to insure accuracy. When a portion of the fumigant is vaporized in the barrel, it is not possible to accurately measure the charge because gas formed due to reduction of pressure on the upstroke condensers on the downstroke, with resulting inaccuracy of charge which the operator is unlikely to notice or to understand why. Accuracy in discharging the measured amount through the spray nozzle at high velocity is essential to gasify the fumigant, so that any lost by spurt or drip is not effective on the tree and produces the same result in the end as if the measuring were inaccurate. The combination of means for producing a sharp cut-off without gas pocket and means for preventing vaporization in the pump cylinder thus results in the achievement of maximum accuracy. The transmission of piston rod thrust to the piston at a point in advance of the packing in either direction of movement is another feature lessening liability of piston leakage by preventing canting of the piston when a relatively short piston and packing are used. The metallic skirt 22 enables predetermined dosages to be measured in the pump barrel and by merely turning the piston rod so that the dog engages a particular slot or a particular shoulder or side of the slot means are provided for certainly adjusting the measurement to the desired quantity. This adjustment is made with facility and without the necessity of counting or reading graduations. In fact, the adjustment of dosage and fumigation with this invention may be performed at night without the necessity of illumination to attain the desired results. The spring of the enclosed pop-off valve is sensitive and just strong enough to hold the valve closed against the head of liquid in the tank but opening readily with a slight increase of pressure over the maximum head in the tank. The invention is not to be limited to the precise details of construction herein illustrated and described except as required by the terms of the appended claims.

I claim:

1. In an apparatus for measuring and discharging a volatile liquid fumigant, the combination with a tank, of a pump barrel into which fumigant flows by gravity from said tank, a piston in said barrel having a passage therethrough, means for charging the barrel through the piston during the upstroke thereof without reduction of pressure on the fumigant, means for measuring the quantity charged, means for closing and for actuating the piston downwardly, to expel the measured charge, a discharge pipe, and a pop-off valve in said pipe preventing leakage of fumigant under the head in said tank.

2. In an apparatus for measuring and discharging a volatile liquid fumigant, the combination with a tank, of a pump barrel into which fumigant flows by gravity from said tank, a piston in said barrel having a passage therethrough, means for charging the barrel through the piston during the upstroke thereof without reduction of pressure on the fumigant, means for measuring the quantity charged, means for closing and for actuating the piston downwardly to expel the measured charge, a discharge pipe, a pop-off valve in said pipe preventing leakage of fumigant under the head in said tank, and means beyond the valve for causing the initial flow to entrain and carry off residual gas trapped in the pipe to prevent spurting by gas expansion after the piston stops.

3. In an apparatus for measuring and discharging a volatile liquid fumigant, the combination with a tank, of a vertical pump barrel into which the fumigant flows by gravity from said tank, a piston in said barrel having a passage therethrough, a piston rod having limited relative motion to said piston for opening said passage on the upstroke whereby to charge the barrel without reduction of pressure on the liquid and to close said passage on the downstroke to actuate the piston and expel the liquid, means for measuring the quantity charged, a substantially horizontal discharge pipe from said barrel, a spray nozzle at the end of said pipe, and a pop-off valve in said pipe between said nozzle and barrel preventing leakage of liquid under the head in said tank.

4. In an apparatus for measuring and discharging a volatile liquid fumigant, the combination with a tank, of a pump barrel into which the fumigant flows by gravity from said tank, a piston in said barrel, a piston rod actuating the piston, a fumigant passage through the piston from one side to the other, means preventing suction on and vaporization of fumigant, comprising mechanism controlled by the piston rod for mechanically opening said fumigant passage in advance of piston movement to pass the fumigant from tank to the discharge end of the barrel during the upstroke and positively closing said passage on the downstroke of the piston to expel fumigant from the barrel, means for measuring the quantity supplied, and a discharge pipe leading from the barrel having a pop-off valve capable of withstanding the pressure of the liquid in the tank.

5. In an apparatus for measuring and discharging a volatile liquid fumigant, the combination with a tank, of a pump barrel into which the fumigant flows by gravity from the tank, a packed piston in said barrel having a passage therethrough, means for limiting the upstroke of said piston to measure the fumigant supplied to the barrel, a piston rod having limited relative motion to said piston for opening said passage on the upstroke whereby to charge the cylinder without reduction of pressure on the fumigant and to close said passage on the downstroke to actuate the piston and expel the fumigant, the actuating engagement between the rod and piston on each stroke being such as to prevent canting of the packing during both strokes, a pipe for discharging fumigant from said barrel, and a pop-off valve in said pipe preventing leakage of fumigant under the head in said tank.

6. In an apparatus for measuring and discharging a volatile liquid fumigant, the combination with a tank, of a pump barrel into which the fumigant flows by gravity from the tank, a piston in said barrel having a passage therethrough, a perforated extension on the upper end of said barrel projecting into said tank, means within the upper end portion of said extension for variably limiting the upstroke of said piston to measure said fumigant, a piston rod having relative movement to said piston for opening said passage on the upstroke whereby to charge the cylinder without reduction of pressure on the liquid and to close said passage on the downstroke to actuate the piston and expel the liquid, a pipe for discharging the liquid from said barrel, and a pop-off valve in said pipe preventing leakage of fumigant past the valve under the head in said tank.

7. In an apparatus for measuring and discharging a volatile liquid fumigant, the combination with a tank, of a vertical pump barrel into which fumigant flows by gravity from said tank, a piston in said barrel having a passage therethrough, a piston rod having limited relative motion to said piston for opening said passage on the upstroke whereby to charge the barrel without reduction of pressure on the fumigant and for closing said passage on the downstroke to actuate the piston and expel the fumigant, means for measuring the quantity charged, a pipe for discharging fumigant from said barrel, a pop-off valve in said pipe between the discharge end thereof and said barrel, and a closed housing above said valve having an outlet passageway leading from the upper portion of said housing for removing any gases that may collect therein.

8. In an apparatus for measuring and discharging a volatile liquid fumigant, the combination with a tank, of a pump, means for flowing the fumigant into said pump without reduction of pressure thereon, means for measuring the quantity of fumigant supplied to the pump, a discharge pipe from said pump, a valve in said pipe, a valve chamber therefor, and means causing the initial flow through the valve to clear the valve chamber of gas whereby to prevent spurting by gas expansion after the piston stops.

Signed at Niagara Falls in county of Niagara and State of New York this 17th day of January, A. D., 1924.

MORTIMER JAY BROWN.